US010102039B2

(12) United States Patent
Jovanovic et al.

(10) Patent No.: US 10,102,039 B2
(45) Date of Patent: Oct. 16, 2018

(54) CONVERTING A HYBRID FLOW

(71) Applicant: ENTIT Software LLC, Sunnyvale, CA (US)

(72) Inventors: Petar Jovanovic, Barcelona (ES); Alkiviadis Simitsis, Santa Clara, CA (US); William K. Wilkinson, San Mateo, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 383 days.

(21) Appl. No.: 13/896,795

(22) Filed: May 17, 2013

(65) Prior Publication Data
US 2014/0344817 A1 Nov. 20, 2014

(51) Int. Cl.
*G06F 9/46* (2006.01)
*G06F 9/50* (2006.01)

(52) U.S. Cl.
CPC .................. *G06F 9/5066* (2013.01)

(58) Field of Classification Search
CPC .................................................. G06F 9/5066
See application file for complete search history.

(56) References Cited

U.S. PATENT DOCUMENTS

| 5,970,490 | A  * | 10/1999 | Morgenstern ..... G06F 17/30569 |
| 7,299,458 | B2 * | 11/2007 | Hammes ....................... 717/133 |
| 7,703,085 | B2   | 4/2010  | Poznanovic et al. |
| 2006/0048113 | A1 * | 3/2006  | Ozone et al. ................. 717/144 |
| 2007/0214111 | A1   | 9/2007  | Jin et al. |
| 2007/0214171 | A1 * | 9/2007  | Behnen ..................... G06F 8/10 |
| 2007/0233745 | A1 * | 10/2007 | Pomerantz ........ G06F 17/30067 |
| 2009/0006447 | A1 * | 1/2009  | Balmin ............. G06F 17/30938 |

FOREIGN PATENT DOCUMENTS

EP 0231594 8/1987
WO WO2009102903 8/2009

OTHER PUBLICATIONS

Olston, et al., "Automatic Optimization of Parallel Dataflow Programs", Retrieved from http://i.stanford.edu/~olston/publications/usenix08.pdf, Apr. 9, 2008, 7 pages.
Simitsis, et al., "Optimizing analytic data flows for multiple execution engines", Proceedings of the 2012 ACM SIGMOD International Conference on Management of Data, Scottsdale, AZ, USA, May 20-24, 2012, 1 page.

* cited by examiner

*Primary Examiner* — Emerson Puente
*Assistant Examiner* — Steven Do

(57) ABSTRACT

Converting a hybrid flow can include combining each of a plurality of task nodes with a plurality of corresponding operators of the hybrid flow and converting the combined plurality of task nodes and the plurality of corresponding operators of the hybrid flow to a data flow graph using a code template.

20 Claims, 6 Drawing Sheets

CONVERTING A HYBRID FLOW

BACKGROUND

A hybrid flow is an analytic flow that may execute on multiple execution engines and/or storage engines. The hybrid flow may be partitioned into fragments where each flow fragment of the hybrid flow can be executed on an execution engine. The fragments may have execution dependencies and/or there may be data flow between fragments. With existing analytic flow design tools and execution engines, hybrid flows can be realized as a collection of scripts and code (e.g., structured query language and Java code) to implement fragments with mixed control flows that orchestrate the overall execution. A mixed control flow can be referred to as a "job".

DETAILED DESCRIPTION

Figure 1:
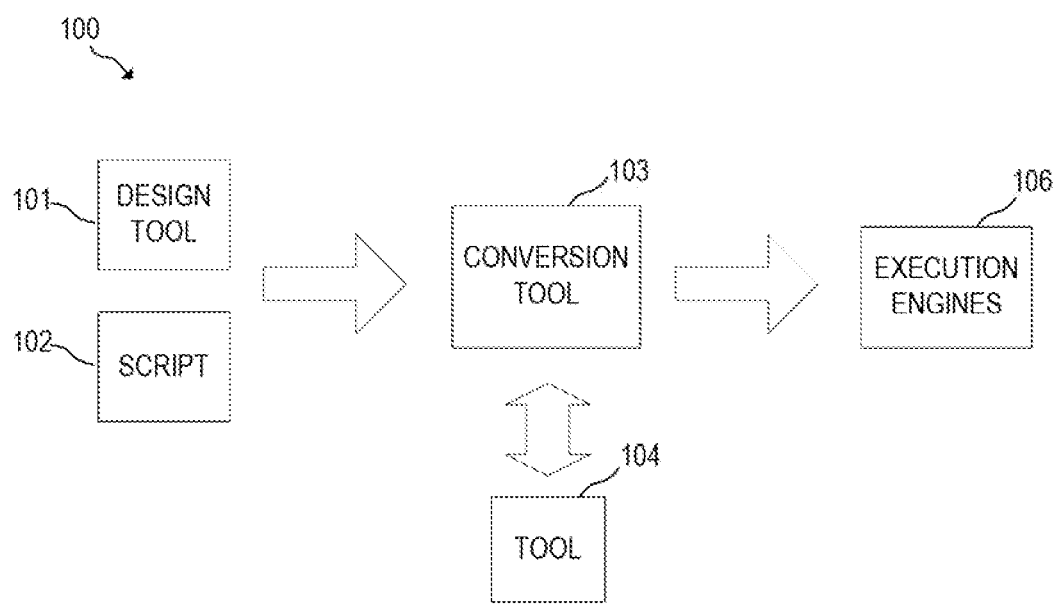
FIG. 1 illustrates an example of an environment for converting a hybrid flow according to the present disclosure.

Analytic flow design tools and execution engines can model a hybrid flow at two levels: task flow and job flow. A task flow can contain a series of operators that form a data flow and data stores that contain a collection of data. The data flow can move data from a particular set of input data stores to a set of result data stores and/or can perform operations on the data. A complex analytic flow (e.g., process) may comprise a number of task flows with data and control dependencies. A job flow can represent a control flow for an entire process. For instance, a job flow can show the flow of information and can contain control capabilities like decision points.

A task flow can be represented by a directed graph with a plurality of interconnected operators and data stores, wherein operators and/or data stores are represented as nodes in the graph and the data flow between operators and/or data stores are represented as edges. An operator can include computer-readable instructions that perform a particular function. Such functions can include a type of computation like cleansing, schema modification, data or text analytics, machine learning functions, stream processing operations, event handling, etc. For example, an operator can include computer-readable instructions to "convert dollars to euros" or "calculate the distance between points x and y".

In addition, a job flow can be represented by a directed graph with a plurality of interconnected tasks and control points, wherein tasks and/or control points are represented as nodes in the graph and the control flow of the job flow can be represented as edges connecting nodes. A task node can be associated with a particular task flow. Each task node can represent a data flow computation of the task flow that may run on a particular execution engine. The workflow for the analytic process can be specified by control point nodes. A control point node can specify a partial order in which to process task nodes, starting and stopping points for the analytic process, decision points in the workflow, and/or termination conditions, among other things. An analytic flow that involves multiple execution engines can be referred to as a hybrid flow. Without loss of generality, each task node can be assigned to execute on a single execution engine.

In some instances, optimizing analytic flows can be beneficial to improve efficiency and operation of the analytic flows. Such optimization may involve reordering operators, replicating data across data sources, and/or reassigning operators from one execution engine to another, among other processes. Optimization can consider the operators and/or data flow of the analytic flow as a whole rather than as separate tasks.

In an example, a hybrid flow can be converted to a data flow graph that contains both control and data flow characteristics of the hybrid flow such that the data flow graph can be optimized and/or processed by other tools. This can be done in an automated fashion, such as without human intervention. Converting a hybrid flow to a data flow graph can include combining graphical structures of a job flow with graphical structures of associated task flow (e.g., task flow graphs that include internal operators of task flows represented by task nodes in the job flow). For instance, operators of a task flow can be combined with task nodes in a job flow graph to flatten (e.g., expand) the job flow graph. The flattened job flow graph can then be converted to a data flow graph by converting the control point nodes to data flow nodes using code templates. The converted data flow graph can preserve control flow semantics of the hybrid flow. The converted data flow graph can be processed by an optimizer and/or execution engines and/or tools. For instance, optimization of the converted data flow graph can be performed in a way that preserves the control flow semantics due to the converted data flow graph preserving the control flow semantics. A variety of optimization techniques can be used to optimize the converted data flow graph. Additional examples, advantages, features, modifications and the like are described below with reference to the drawings.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

The figures herein follow a numbering convention in which the first digit or digits correspond to the drawing figure number and the remaining digits identify an element or component in the drawing. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, the designators "K", "N", "P", "R", "S", and "U" particularly with respect to reference numerals in the drawings, indicate that a number of the particular feature so designated can be included with a number of examples of the present disclosure. Also, as used herein, "a number of" an element and/or feature can refer to one or more of such elements and/or features.

FIG. 1 illustrates an example of an environment 100 for converting a hybrid flow according to the present disclosure. The environment 100 can be used to convert a hybrid flow to a single data flow graph. The hybrid flow, as used herein, can include a mixed control flow and a plurality data flow graph (e.g., task flows).

The hybrid flow can be represented as a combination of script and/or mixed control flows (e.g., job flows). A hybrid flow can be input into the environment 100 as a mixed control flow from analytic flow design tools 101, execution engines and/or tools (e.g., optimizers). The analytic flow design tools 101 can be used to capture the schemata of nodes (e.g., input, output, parameters, etc.), properties (e.g., selectivity, data size for data storages), and other resources (e.g., memory) and features (e.g., the coordinates of the node on the design canvas, if the input flow comes from an analytic flow design tool 101).

Using the input flow from an analytic design tool 101 and/or input script 102 of the hybrid flow, the hybrid flow can be converted to a single data flow using a conversion tool 103. The conversion tool 103 can include hardware components and/or software components designated and/or designed to convert a hybrid flow to single data flow and/or convert a single data flow to a hybrid flow (e.g., a job flow graph and/or task flow graphs). The single data flow can be represented as a data flow graph. For instance, the data flow graph can be encoded in an extract-transfer-load (ETL) logical model (xLM) language, which is an example language for representing logical data flows such as ETL flows. As used herein, xLM can include a computer-readable language that is represented in extensible markup language (XML). That is, the data flow graph encoded in xLM language can include a logical ETL model expressed in XML. For instance, a data flow graph encoded in xLM can capture structural information for the hybrid flow, like nodes and edges of the flow graph. In addition, the single data flow can contain requirements, resource information, features and properties of the hybrid flow, and/or other flow metadata.

The single data flow (e.g., a data flow graph) can be input to tools 104. A tool (e.g., a process tool) can include hardware components and/or software components designated and/or designed to process and/or test data flows (e.g., the converted data flow graph). A tool can, for instance, operate on a single data flow graph at a time (e.g., thus it cannot operate on a job flow graph and a plurality of task flow graphs at the same time). For instance, the single data flow can be input to an optimizer. An optimizer can include a tool to optimize execution of the hybrid flow.

The single data flow can be input to a variety of tools. For instance, the single data flow can be input to a tool that can decompose a single, long task flow into a single job flow of multiple task flows where each task flow executes after the next. In some instances, the single data flow can be input to a tool that modifies a job flow that includes task flows that are targeted to execute on a particular engine (e.g., engine x) to a new job flow in which the particular engine (e.g., engine x) is replaced by a different engine (e.g., engine y). In such an instance, the particular engine (e.g., engine x) may become obsolete and/or unavailable. In various instances, the single data flow can be input to a tool that composes a number of individual task flows into a single job flow (e.g., because the task flows have a common sub-computation).

The single data flow can be converted back to a job flow and/or task flows by the conversion tool 103, in various examples of the present disclosure. That is, the tool 104 can perform a computation and/or process on the data flow graph and send the data flow graph back to the conversion tool 103. Converting the data flow graph back to a job flow and/or task flows can include reconverting each node (e.g., converted operator) of the converted data flow graph (e.g., single data flow) back into the form that the execution engine 106 expects and/or can process (e.g., as discussed further herein). Fragments of the reconverted job flow can be input into appropriate execution engines 106. An execution engine, as used herein, can include hardware components and/or computer-readable instruction components designated and/or designed to execute a particular function and/or fragment of a job flow.

Figure 2:
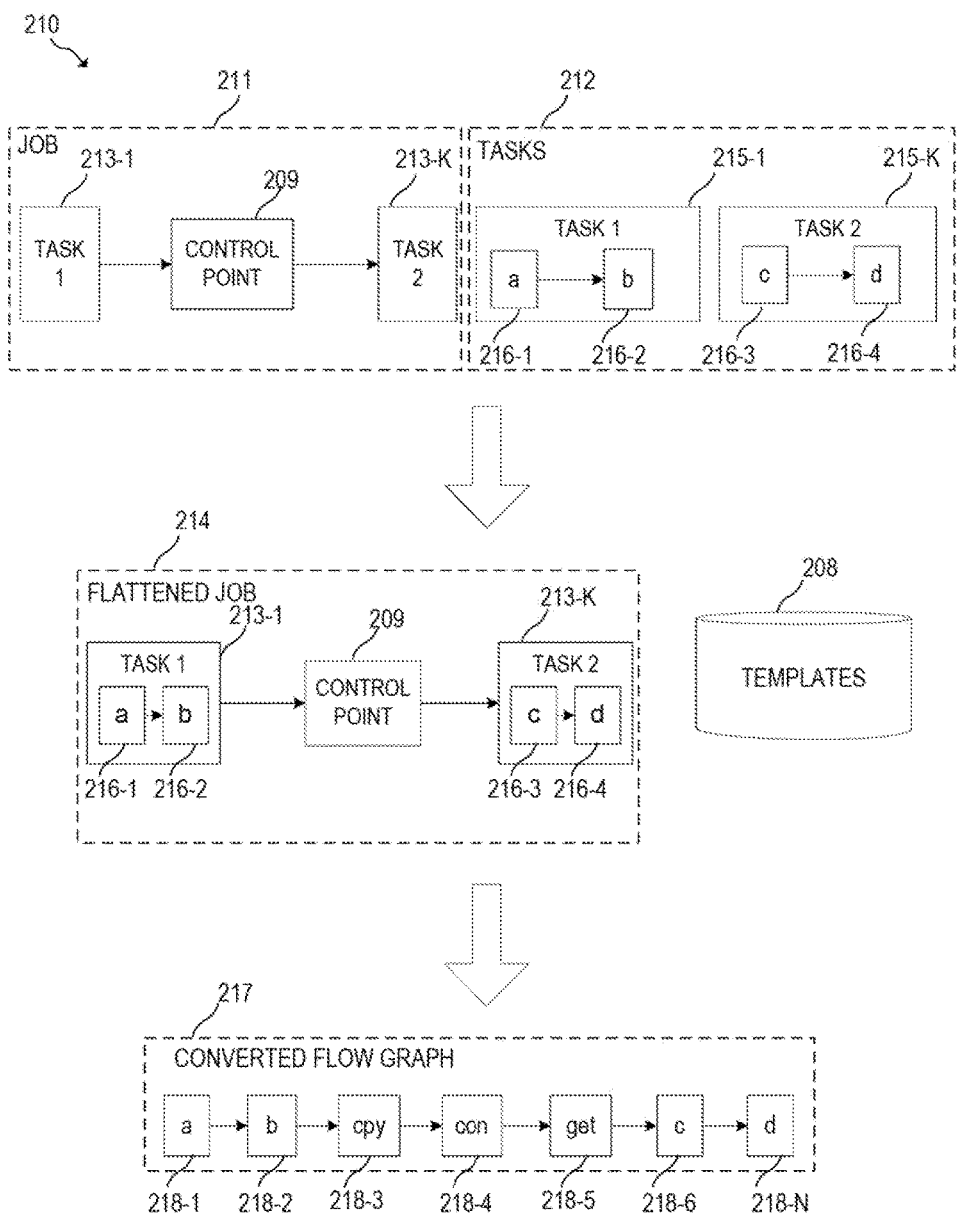
FIG. 2 is a flow diagram of an example of a process for converting a hybrid flow according to the present disclosure.

FIG. 2 is a flow diagram of an example of a process 210 for converting a hybrid flow according to the present disclosure. The process 210 can convert the hybrid flow to a single data flow graph, for instance. The hybrid flow can be represented by a job flow graph 211.

The job flow graph 211 can include task nodes 213-1, . . . , 213-K and control point nodes (e.g., control point 209) connected by edges (e.g., represented by an arrow). Each task node 213-1, . . . , 213-K can be executed by a different execution engine. Each task node (e.g., 213-1, . . . , 213-K) in the job flow 211 can be analyzed as task flows 212 (e.g., as data flows). The task flows 212 can be represented by a plurality of task flow graphs 215-1, . . . , 215-K. A task flow graph (e.g., 215-1 and 215-K) can include operators of a task flow (e.g., operators a 216-1 and b 216-2 internal to a task flow represented by task flow graph 1 215-1 and operators c 216-3 and d 216-4 internal to a task flow represented by task flow graph 2 215-K) in a task flow. Each task flow graph 215-1, . . . , 215-K can be associated with a task node 213-1, . . . , 213-K from the job flow 211. An associated task flow graph 215-1, . . . , 215-K can include a task flow graph containing the operators of a task flow (e.g., the internal operators of a task flow represented by the task node). Thereby, the operators contained in the task flow graph 215-1, . . . , 215-K can correspond to a task node 213-1, . . . , 213-K of the job flow 211 (e.g., operator a 216-1 and b 216-2 correspond to task node 1 213-1 of the job flow graph 211). Connected operators 216-1, 216-2 and 216-3, 216-4 in task flows 215-1 and 215-K are connected by edges (e.g., the arrow connecting operator a 216-1 to operator b 216-2 in task flow graph 1 215-1 and the arrow connecting operator c 216-3 to operator d 216-4 in task flow graph 2 215-K).

The job flow graph 211 can include a number of control point nodes (e.g., control point 209). A control point node can specify a partial order in which to process task nodes, starting and stopping points for the analytic process, decision points in the workflow, and/or termination conditions, among other things. Although the present example illustrates one control point node, examples in accordance with the present disclosure are not so limited. For instance, a job flow graph can include a plurality of control point nodes.

The process 210 can include combining the job flow graph 211 with the plurality of associated task flow graphs 215-1, . . . , 215-K (e.g., task flow graphs containing internal operators of task nodes 213-1, . . . , 213-K of the job flow graph 211) of the hybrid flow. For instance, combining the graphs 211, 215-1, . . . , 215-K can include combining each of a plurality of identified task nodes 213-1, . . . , 213-K of the job flow graph 211 with a plurality of corresponding operators 216-1, ..., 216-4 (e.g., internal operators of task flows represented by task nodes of the job flow graph) of the hybrid flow. The combined graph can include a flattened job flow graph 214, for example.

A flattened job flow graph 214 can include a graph of the job flow 211 with task nodes 213-1, ..., 213-K containing internal operators (e.g., 216-1, 216-2, 216-3, 214-4) of each task flow (e.g., represented by a task node 213-1, ... 213-K) and a number of control point nodes (e.g., control point 209). In some examples, the process 210 can include separating an operator among the plurality of operators 216-1, ..., 216-4 to convert the hybrid flow (e.g., flattened job flow 214) to a single data flow graph 217 (e.g., as discussed further herein).

The flattened job flow graph 214 can be mapped to code templates 208. The code templates 208 can each include an xLM template, for instance. Mapping to the code templates 208 can include mapping each node of the flattened job graph 214 to the code templates 208. In various examples, the mapping can include mapping to a plurality of code templates 208. For instance, each type of control point node (e.g., 209) can be mapped to a different code template.

Using the mapped code templates 208, the process 210 can include converting the flattened job flow graph 214 into a data flow graph 217. The converted data flow graph 217 can, for instance, include the single data flow. The converted data flow graph 217 can include a plurality of converted operator nodes 218-1, 218-2, 218-3, 218-3, 218-4, 218-5, 218-6, ..., 218-N. The plurality of converted operator nodes 218-1, ..., 218-N can include the plurality of operators (e.g., 216-1, ..., 216-4) from the flattened job graph 214 and a number of additional operators 218-3, 218-4, 218-5 converted to a common code (e.g., using the mapped code templates).

The additional operators (e.g., 218-3, 218-4, and 218-5) can include new operators added due to separation of an operator with multiple functions and/or an added connector operator to connect task nodes (e.g., connecting task node 1 213-1 and task node 2 213-K of the flattened job flow graph 214), as discussed further herein (e.g., with regards to FIGS. 3A-3D). For instance, the added connector operator (e.g., con 218-4) can capture the control point logic (e.g., of control point 209) in addition information on how to connect task flows (e.g., how to connect the two task nodes 213-1, 213-K).

Although the example of FIG. 2 illustrates two task nodes 213-1, 213-K and two task flow graphs 215-1, 215-K, a control point node 209, four operators 216-1, ..., 216-4, and seven converted operators nodes 218-1, ..., 218-N, examples in accordance with the present embodiment are not so limited and can include a variety of numbers of each of the features illustrated in FIG. 2.

Figure 3A:
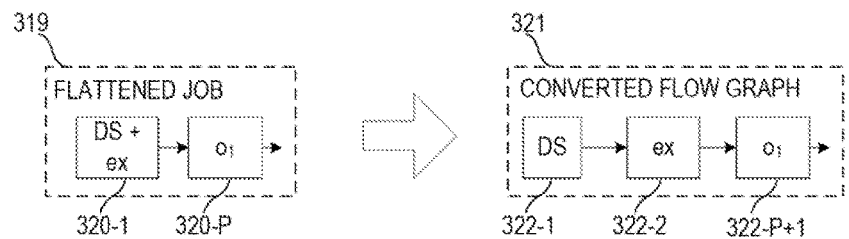
FIGS. 3A-3B illustrate examples of separating an operator into two operators according to the present disclosure.
Figure 3B:
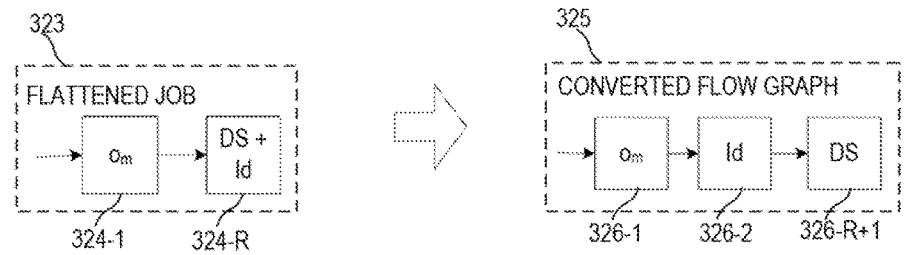

FIGS. 3A-3B illustrate examples of separating an operator into two operators according to the present disclosure. The operator (e.g., 320-1 of FIG. 3A and 324-R of FIG. 3B) to be separated into two operators (e.g., 322-1 and 322-2 of FIG. 3A and 326-2 and 326-R+1 of FIG. 3B) can include an operator of a task flow graph that is part of a flattened job flow graph 319, 323 (e.g., internal operators of the task flow represented by the task node).

The operators (e.g., 320-1, 324-R) can include composite operators. A composite operator, as used herein, can include an operator with multiple functionalities. Some analytic flow design tools can encapsulate composite functionality into a single composite operator (e.g., 320-1, 324-R), for instance.

The graphs 319, 323 illustrated by FIGS. 3A-3B can include flattened job flow graphs that include composite operators (e.g., 320-1, 324-R). A flattened job flow graph, as used herein, can include a combined graph. For instance, a job flow graph can be combined with a plurality of associated task flow graphs (e.g., task flow graphs containing a plurality of internal operators of a task flow) of a hybrid flow to form a combined graph. The combined graph can contain the structures of the job flow graph and the associated task flow graphs. As an example, the combined graph can include a plurality of task nodes from the job flow graph combined with a plurality of operators from the associated task flow graphs (e.g., internal operators of a task flow represented by a task node).

In various examples of the present disclosure, the composite operators (e.g., 320-1, 324-R) of the task flow graphs that are part of the flattened job flow graph 319, 323 can be decomposed into two separate operators when converting the flattened job flow graph 319, 323 to a single data flow graph 321, 325. The separated operators (e.g., the decomposed operators) can each encode a functionality of the composite operator (e.g., 320-1, 324-R).

For instance, a composite operator (e.g., 320-1 and 324-R of FIGS. 3A and 3B) of a task flow graph that is part of the flattened job flow graph 319, 323 can include multiple functions. The multiple functions can include a data store function and a data computation function, for example. The multiple functions of the operator (e.g., 320-1 and 324-R) can be separated into two separate operators (e.g., 322-1 and 322-2 of FIG. 3A and 326-2 and 326-R+1 of FIG. 3B). The separate operators can include a data computation operator including the data computation function and a data store operator including the data store function. The data computation operator and/or the data store operator can have adjusted input and/or output schema based on predecessor operators (e.g., as discussed further herein).

FIG. 3A illustrates an example of separating an operator 320-1 with a data store function and extraction code. The operator 320-1 with data store function and extraction code can be a portion of a task flow graph that includes a plurality of operators 320-1, ..., 320-P. The plurality of operators 320-1, ..., 320-P of the task flow graph can be combined with task nodes of a job flow graph to form a flattened job flow graph 319 (e.g., internal operators from task flow graphs can be combined with task nodes to form a flattened job flow graph 319).

The operator 320-1 can include a data computation (e.g., filter, evaluate an expression, merging, and aggregating information) along with reading threads that read data from a data store. That is, the operator 320-1 can include a composite operator. The data computation can be built-in with the reading threads. When converting the flattened job flow graph 319 with a composite operator (e.g., operator 320-1) to a data flow graph 321, the operator 320-1 can be separated into a data store operator 322-1 and a data computation operator 322-2.

Separating the operator 320-1 can include separating the reading threads and data computation code. The data computation code can include extraction code. The extraction code can form a new operator, called an extractor operator 322-2. The data store operator 322-1 can include an operator with reading threads from the operator 320-1. The input schema for the extractor operator 322-2 can be the same as the output schema for the data store operator 322-1. That is, the extractor operator 322-2 can include a consumer operator of the data store operator 322-1. A consumer operator (e.g., the extractor operator 322-2), as used herein, can include an operator whose input schema matches the output schema of the previous operator (e.g., the data store operator 322-1). The output schema of the extractor operator 322-2 can depend on the extraction code and can match the input schema of the subsequent operator 322-P+1 (e.g., a consumer operator of the extractor operator 322-2).

FIG. 3B illustrates an example of separating an operator 324-R with data store function and loading code. The operator 324-R with data store function and loading code can be a portion of a task flow graph that includes a plurality of operators 324-1, . . . , 324-R. The plurality of operators 324-1, . . . , 324-R of the task flow graphs can be combined with task nodes of a job flow graph to form a flattened job flow graph 323.

The operator 324-R can include a data computation (e.g., filter, evaluate an expression, merging, and aggregating information) along with writing threads that write data to a data store. That is, the operator 324-R can include a composite operator. The data computation can be built-in with the writing threads. When converting the flattened job flow graph 323 with the composite operator (e.g., operator 324-R) to a data flow graph 325, the operator 324-R can be separated into a data computation operator 326-2 and a data store operator 326-R+1.

Separating the operator 324-R can include separating the writing threads and data computation code. The data computation code can include loading code. The loading code can form a new operator, called a loader operator 326-2. The input schema for the loader operator 326-2 can be the same as the output schema of the predecessor operator 326-1 in the flow. That is, the loader operator 326-2 can include a consumer operator of the predecessor operator 326-1. The output schema of the loader operator 326-2 can depend on the loading code and can match the input schema of the data store operator 326-R+1. That is, the loader operator 326-2 can include a producer operator of the data store operator 326-R+1. A producer operator, as used herein, can include an operator (e.g., loader operator 326-2) whose output schema matches the input schema of the predecessor operator (e.g. the data store operator 326-R+1).

Flattening the job flow graph to form a flattened job flow graph 319, 323 and/or separating operators when converting the flattened job flow graph with a composite operator (e.g., 320-1, 324-R) to a data flow graph 321, 325 can increase the number of operators and/or nodes of the graph representing the flow. This can increase flow size, however, the cohesion of the graph of the flow can improve due to the modularity of each operator increasing (e.g., each operator performs one function/computation). Depending on the computation extracted from the read/write threads, the overall flow maintainability may improve. For instance, the cohesion of an operator op can be represented as the ratio:

$$\text{cohesion}(op) = \frac{func_{in} + func_{out}}{f \times (in + out)}.$$

Wherein $func_{in}$ and $func_{out}$ can denote a cardinality of functionally related to input and output schemata of operator op, and in and out can denote the cardinality of its input and output schemata, respectively. f can denote the number of functions/computations in the operator op. Therefore, the more computation employed, the less cohesive the operator op is. And, this can propagate to the entire flow since the cohesion of the flow can be seen as the average cohesion of its operators.

In various examples, the converted data flow graph can allow an optimizer to blend in the extraction and loading computations and to produce a globally optimal solution.

Further, an optimizer may reverse the process and put together all operators running on the same execution engine. This may push the operators down to the execution engine, which may leverage the optimization capabilities of the execution engine. This technique, sometimes called pushdown optimization, is used by some previous tools. However, pushdown optimization performed by such previous tools is limited to operators running on a database engine and is not applied to the entire flow (e.g., global). Rather, the previous tools apply pushdown optimization at the beginning and end of a flow; the moment an operator is reached that cannot run on a database engine, the pushdown optimization stops. Using a single data flow graph of a hybrid flow, in accordance with examples of the present disclosure, global pushdown optimization can be performed.

Figure 3C:
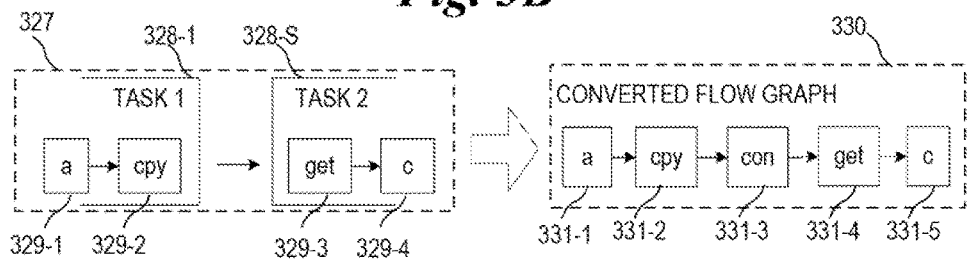
FIGS. 3C-3D illustrate examples of adding connector operators according to the present disclosure.
Figure 3D:
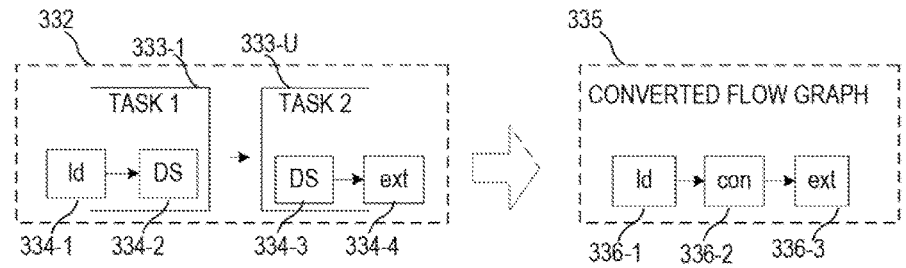

FIGS. 3C-3D illustrate examples of adding connector operators (e.g., 331-3 of FIG. 3C and 336-2 of FIG. 3D) according to the present disclosure. As illustrated in FIGS. 3C and 3D, a flattened job flow graph 327, 332 can include a plurality of task nodes (e.g., 328-1, . . . , 328-S of FIG. 3C and 333-1, . . . , 333-U of FIG. 3D) combined with a plurality of corresponding operators (e.g., internal operators 329-1, 329-2, 329-3, 329-4 of a task of FIG. 3C and internal operators 334-1, 334-2, 334-3, 334-4 of a task of FIG. 3D). Converting the flattened job flow graph 327, 332 to a data flow graph 330, 335, respectively, can include adding a connector operator (e.g., 331-3 of FIG. 3C and 336-2 of FIG. 3D) between operators (e.g., converted operators 331-2 and 331-4 of FIG. 3C and 336-1 and 336-3 of FIG. 3D) associated with a connection between two task nodes (e.g., 328-1 and 328-S of FIG. 3C and 333-1 and 333-U of FIG. 3D) in the flattened job flow graph 327, 332.

For instance, a job flow may comprise a plurality of task flows that are connected to each other in a variety of ways. The task flows may be between the same execution engine, such as data that may be stored on a file system as they pass from one task flow to another and/or data that is pipelined from one task flow to another. In addition, task flows may be connected between different execution engines, such as $e_1$ and $e_2$, wherein the data is transferred through the file system of either execution engine and/or the data is pipelined from one task flow to another. Data transferred from one task flow to another may be regulated by a control point operator. A control point operator, as used herein, can include an operator that performs a control function. For example, a control point operator may prevent transfer of data from one task flow to another until a threshold amount of data has arrived. The threshold amount of data can include a numerical value and/or range (e.g., 100% and 50%), for example.

To uniformly capture the semantics as a job flow graph is combined with associated task flow graphs, a connector operator (e.g., 331-3 and 336-2) is added to the converted data flow graph 330, 335. The connector operator (e.g., 331-3 and 336-2) is added to the converted data flow graph 330, 335 as a regular node. The metadata of the connector operator (e.g., 331-3 and 336-2) encodes the type of connection so that an optimizer and/or other tool can use the knowledge (e.g., pipeline, control operator, disk memory, memory storage, etc.) and can calculate the cost of the added connector operator (e.g., 331-3 and 336-2). The metadata is contained within the connector operator (e.g., 331-3 and 336-2), but hidden from the optimizer and/or other tool, as the information can be used to convert the connector operator (e.g., 331-3 and 336-2) in the converted data flow graph 330, 335 back to its original form (e.g., reconvert to a hybrid flow).

FIG. 3C illustrates an example of adding a connector operator 331-3. The connector operator 331-3 illustrated in FIG. 3C can include a pipeline connector operator. A pipeline connector operator (e.g., connector operator 331-3) pipelines data from a first task flow (e.g. task node 1 328-1) to a second task flow (e.g., task node 2 328-S). In some instances, an external execution engine can define the operators for transferring data rows (e.g., tuples) between task flows (e.g., task node 1 328-1 and task node 2 328-S) inside a job flow (e.g., flattened job flow graph 327). Such a connector operator 331-3 may use shared memory space to send and get data.

When converting a flattened job flow graph 327 of a particular execution engine into a converted data flow graph 330, if the task node 328-1 before (e.g., a producer) and task node 328-S after (e.g., a consumer) the connection point (e.g., the arrow illustrated in the flattened job flow graph 327) use a shared memory space, than a pipeline connector operator (e.g., 331-3) can be added to the converted data flow graph 330 as a node connecting the operator (e.g., converted operator 331-2) before the connection and the operator (e.g., converted operator 331-4) after the connection.

The added pipeline connector operator (e.g., 331-3) can have input and output schema defined based upon the converted operators (e.g., 331-2, 331-4) connected to the connector operator 331-3. The input schema of the connector operator 331-3 can correspond to the output schema of its producer (e.g., converted operator 331-2 before the connector operator 331-3) and the output schema of the connector operator 331-3 can correspond to the input schema of its consumer (e.g., converted operator 331-4 after the connector operator 331-3). The particular semantics of the connector operator 331-3 can be captured as a set of properties defined inside the connector operator 331-3 (e.g., in the corresponding code fragment of the common code). Edges are added in the converted data flow graph 330 to connect the connector operator 331-3 to its producer (e.g., operator 331-2) and its consumer (e.g., 331-4).

As illustrated in FIG. 3C, the resulting converted data flow graph 330 can include a number of nodes 331-1, 331-2, 331-3, 331-4, 331-5 representing converted operators (e.g., 329-1, 329-2, and 329-4), converted control point nodes (e.g., not illustrated by FIG. 3C), and a connector operator (331-3). The control point logic (e.g., of a control point node), in various examples, can be encoded in the added connector operator (e.g., 331-3). The nodes 331-1, 331-2, 331-3, 331-4, and 331-5 can be connected by edges representing connections (e.g., flow of data) between the nodes 331-1, 331-2, 331-3, 331-4, and 331-5

FIG. 3D illustrates an example of adding a connector operator 336-2. The connector operator 336-2 illustrated in FIG. 3D can include a data store connector operator. A data store connector operator, as used herein, can include a data store operator that encapsulates data store operators involved in a job flow (e.g., flattened job flow graph 332). In some instances, two task flows in a job flow may connect through a data source (e.g., one or more data stores). For example, as illustrated in FIG. 3D, task node 1 333-1 may connect to task node 2 333-U in a flattened job flow graph 332 through connected data store operators (e.g., data store operator 334-2 internal to a task flow represented by task node 1 333-1 and data store operator 334-3 internal to a task flow represented by task node 2 333-U). In such an example, the data store operator before the connection point (e.g., consumer) and the data store operator after the connection point (e.g., producer) store and read, respectively, to and from the data store. The data store is accessible from both the producer task flow and the consumer task flow. Note that the producer and consumer task flows may execute on different execution engines and may separately access additional data stores.

As illustrated in the example of FIG. 3D, operators of a task flow graph that are combined with a task node (e.g., 333-1 and 333-U) in the flattened job flow graph 332 can be expanded when converting the flattened job flow graph 332 resulting in expanded task nodes 333-1, 333-U. The expanded task nodes 333-1, 333-U can include a composite operator in task node 1 333-1 that is separated into a loader operator 334-1 and a data store operator 334-2. In addition, the expanded task nodes 333-1, 333-U of the flattened job flow graph 332 can include an operator in task node 2 333-U that is separated into a data store operator 334-3 and an extractor operator 334-4. Although the present example illustrates the task nodes being expanded prior to converting the flattened job flow graph 332, examples in accordance with the present disclosure are not so limited. The task nodes can be expanded during conversion of the flattened job flow graph 332, in various embodiments.

To convert the flattened job flow graph 332 with expanded task nodes 333-1, 333-U to a data flow graph 335, a data store connector operator (e.g., operator 336-2) can be added that encapsulates the data store operators 334-2, 334-3 involved in the job flow (e.g., flattened job flow graph 332). That is, a data store connector operator (e.g., 336-2) can be added to the converted data flow graph 335 as a node encompassing the data store operator (e.g., 334-2) before the connection and the data store operator (e.g., 334-3) after the connection. The added connector operator 336-2 can connect the operator prior to and/or after (e.g., operators 334-1 and 334-4) each data store operator 334-2, 334-3.

The added data store connector operator (e.g., 336-2) can have input and output schema defined based upon the converted operators (e.g., 336-1 and 336-3) connected to the connector operator 336-2. The input schema of the connector operator 336-2 can correspond to the output schema of its producer (e.g., converted loader operator 336-1 before the connector operator 336-2) and the output schema of the connector operator 336-2 can correspond to the input schema of its consumer (e.g., converted extractor operator 336-3 after the connector operator 336-2). The particular semantics of the connector operator 336-2 can encapsulate the data stores (e.g., the data store operators 334-2 and 334-3) and can be captured as a set of properties defined inside the connector operator 336-2 (e.g., in the corresponding code fragment of the common code). Example semantics can include type and flow identification (ID) of the encapsulated data stores, file paths, database connections, partitioning and/or clustering schema, among other metadata. Edges are added in the converted data flow graph 335 to connect the connector operator 336-2 to its producer (e.g., converted operator Id 336-1) and its consumer (e.g., converted operator ext 336-3).

The resulting converted data flow graph 335 can include a number of nodes 336-1, 336-2, 336-3 representing converted operators (e.g., 336-1 and 336-3) and a connector operator 336-2. The nodes 336-1, 336-2, 336-3 can be connected by edges representing connections between the nodes 336-1, 336-2, 336-3.

Although the examples of FIGS. 3A-3D illustrate a particular number of each particular feature (e.g., task nodes, operators, converted operators/nodes, etc.) examples in accordance with the present embodiment are not so limited.

The number of each particular feature can include a variety of numbers that may be more or less than illustrated in FIGS. 3A-3D, for instance.

Figure 4A:
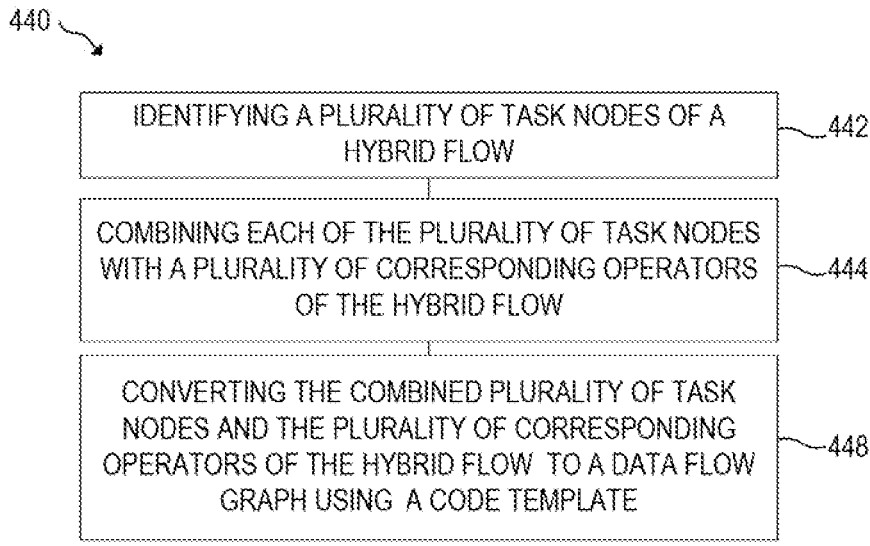
FIGS. 4A-4B illustrate flow charts of examples of methods for converting a hybrid flow according to the present disclosure.
Figure 4B:
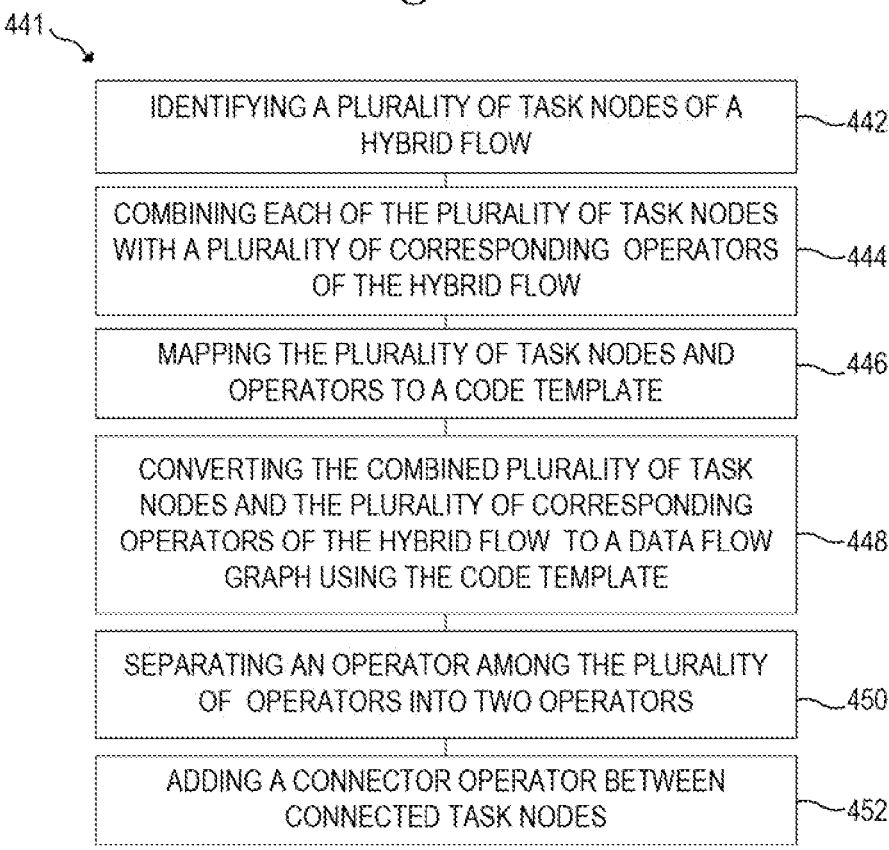

FIGS. 4A-4B illustrate flow charts of examples of methods 440, 441 for converting a hybrid flow according to the present disclosure. For instance, the methods 440, 441 can be used to convert a hybrid flow into a single data flow graph. A hybrid flow can include a mixed control flow (e.g., a job flow) and data flows (e.g., task flows). For instance, a hybrid flow can be represented by a job flow graph and a plurality of associated task flow graphs (e.g., task flow graphs of the task flows represented by task nodes in a job flow graph).

FIG. 4A illustrates a flow chart of an example method 440 for converting a hybrid flow. At block 442, the method 440 can include identifying a plurality of task nodes of a hybrid flow. The plurality of task nodes can be identified and/or associated with a job flow. For instance, the task nodes can include nodes in a job flow graph. The job flow graph can include the plurality of task nodes and control point nodes of a process.

At 444, the method 440 can include combining each of the plurality of task nodes with a plurality of corresponding operators of the hybrid flow. The operators can be associated with the plurality of task flows. A task flow can contain a series of operators that form a data flow (e.g., a task flow). For instance, one or more operators can include a node in a task flow graph. A task flow graph can include operator nodes and data store nodes with edges capturing the flow of data among them. A job can, for instance, include a combination of task nodes that represent a control flow for the entire process. Combining corresponding operators with each task node can include combining internal operators of a task flow represented by the task node. Thereby, the task nodes in the job flow graph are combined with their graph structures (e.g., corresponding operators of the task flow).

At 448, the method 440 can include converting the combined plurality of task nodes and the plurality of corresponding operators (e.g. internal operators of a task flow) of the hybrid flow to a data flow graph using a code template. For instance, the code template can include an xLM template. In various examples, converting can include mapping the combined plurality of task nodes and plurality of corresponding operators of the hybrid flow to the code template (e.g., as discussed further herein).

FIG. 4B illustrates a flow chart of an example method 441 for converting a hybrid flow. The method 441 can include identifying a plurality of task nodes of a hybrid flow, combining each of the plurality of task nodes with a plurality of corresponding operators of the hybrid flow, and converting the combined plurality of task nodes and the plurality of corresponding operators of the hybrid flow to a data flow graph using a code template, as illustrated by 442, 444, and 448 of FIG. 4A and FIG. 4B.

In various examples, at 446, the method 441 can include mapping the plurality of task nodes and operators to a code template. The mapping can include a 1:1 mapping of a node and/or operator to the code template. In various examples, the code template can include a plurality of templates. For instance, each control point node of a job task flow can be mapped to a different template based on the type of control point node (e.g., start, stop, etc.)

At 450, the method 441 can include separating an operator among the plurality of corresponding operators into two operators. The operator can include an identified operator that contains a data computation function and a data store function. The two separated operators can each contain a single function. For instance, a first operator can include a data computation function and a second operator can include a data store function.

At 452, the method 441 can include adding a connector operator between connected task nodes. For instance, adding the connector operator can include adding an operator connecting operators between two task nodes.

FIGS. 5A-5D illustrate examples of merging two operators from a data flow graph into an operator according to the present disclosure. In various examples of the present disclosure, a converted data flow graph (e.g., an xLM flow graph) can be converted back into a job flow and associated task flows to be dispatched to appropriate execution engines (e.g., as a code) and/or to be sent to an analytic flow design tool that it originally came from.

Converting a converted data flow graph back to a job flow and/or task flows can include converting each node (e.g., converted operator) of the converted data flow graph back into the form that the tool and/or execution engine expects and/or can process. For instance, the conversion can be based on the mapped code templates. However, the conversion back may include a number of validation steps to ensure that the generated data flow is executable inside the chosen execution engine, the generated engine-specific flow level is valid (e.g., task or job), the generated engine-specific flow corresponds to the nature of the given execution engine (e.g., operators like fork, merger, and extractor/loader/data store operators can be blended together by a single operation, as discussed further herein), the metadata of the generated operators corresponds to the current surrounding flow (e.g., input operators for binary operations stored inside the operators itself), and connectors among the task flows inside a job flow are resolved.

The validation can be performed as the input converted data flow graph is parsed (e.g., xLM flow). However, because different levels of validation may use different parts of the flow, the validation operations are performed at different moments of the parsing process. For instance, the validation for the content of the operators can be performed while the particular operators are being parsed. The validation of the relationship among different operators can be performed after the complete flow is parsed. The reason for the latter is the order of the operators inside the input converted data flow graph is not guaranteed, and, thus, the parsing of the operators that are included in a validation operation may occur in an underdetermined order. For efficiency purposes, only needed operators and not the entire set of operators, may be parsed the second time (e.g., for the later performed validation).

Validation can be performed as follows. While the converted data flow (e.g., the converted data flow graph) is read by a data flow parser (e.g., an xLM parser), data is collected from the converted data flow. The data is used to generate appropriate metadata structure of the flow imported to the chosen execution engine. For instance, stored metadata structure can be read along with the metadata of the specific nodes. Along with the metadata, the properties and parameters specific to each operator of the imported converted data flow can be read and converted (e.g., translated) to the engine-specific structures. Depending on an operator, the different specific parameters and properties are captured from the input converted data flow (e.g., xLM flow). Different operators can be grouped by common metadata that they contain (e.g., fields, conditions, keys, etc.). The result of the validation can ensure that the information from the input converted data flow graph is captured and converted into the structures understandable by the execution engine.

As with the original hybrid flow, two types of flows are produced through validation: data flows (e.g., task flows) and control flow (e.g., a job flow). Depending on a flow type sent to an optimizer and/or other tool and/or execution engine, the engine-specific flow metadata of these flows is stored differently. For example, when importing a converted data flow graph into a chosen engine, special attention can be given to interpreting the stored metadata and, thus, producing the correct type of flow (e.g., task flows or job flow).

For task flows (e.g. data flows), only one entry for the flow metadata is generated. In such a case, each operator belongs to the same data flow. Thereby, the transformations are referenced through a flow identification (ID) value. After the metadata of each operator is generated, the operators are connected by their appropriate edges and the metadata of the task is generated. Metadata of the task flow can be imported into the chosen execution engine.

For job flows (e.g., control flows), the complete flow can be dividing into different task flows and separate metadata entries can be generated for each of these task flows. In addition, a separate metadata entry can be generated for defining the surrounding job flow (e.g., control flow). In such a case, different operators may belong to different task flows, and, thus, reference them through their flow ID value. For instance, the metadata of each task flow can be generated as in the case of task flows, along with the appropriate validation of the connectors (e.g., as discussed further herein). The metadata of the job flow can contain the generated task flows metadata and can be imported into a chosen execution engine.

As discussed herein, the engine-specific flows can use different representations for some portions of the data flow (e.g., data stores). However, inside the converted flow language (e.g., xLM), these portions of the data flow can be represented in a common and uniform way. Therefore, during importation of the converted data flow graph inside the chosen execution engine, these portions can be converted into engine-supported structures and their semantics can be validated with the converted data flow graph. For instance, different validation operations can be performed on particular portions of the converted data flow graph, such as data store operator, fork operator, and merger operator nodes (e.g., as discussed further herein).

Figure 5A:
FIGS. 5A-5D illustrate examples of merging two operators from a data flow graph into an operator according to the present disclosure.
Figure 5B:
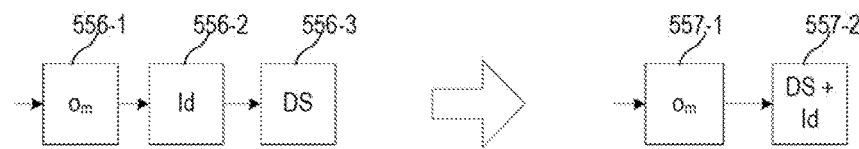

FIGS. 5A-5B illustrate examples of validating data store operator nodes (e.g., 554-1 of FIG. 5A and 556-3 of FIG. 5B). Validation of data store operator nodes can be used to reconvert a converted data flow graph into a hybrid flow.

FIG. 5A illustrates validating a separated data store operator 554-1 and an extractor operator 554-2. In some instances, a task node of a flattened job flow graph can be expanded by separating a data store function from a data computation of a composite operator. The expansion of the task node can occur, for instance, when converting the flattened job flow graph to a data flow graph (e.g., as illustrated by the example of FIG. 3A). The expanded task node can include a separated data store operator 554-1 connected to a separated extractor operator 554-2 and connected to an additional operator 554-3. Although the present example illustrates one additional operator 554-3, examples in accordance with the present disclosure are not so limited and can include multiple additional operators.

When a converted data flow graph (e.g., converted operators 554-1, 554-2, and 554-3) is reconverted back into a hybrid flow (e.g., translated to an engine-specific encoding), the separated data store operator 554-1 and separated extractor operator 554-2 may be merged into a single operator 555-1. Thereby, the reconverted hybrid flow can include an operator 555-1 with data store functionality and data computation functionality (e.g., a composite operator) connected to an additional operator 555-2.

FIG. 5B illustrates validating a separated loader operator 556-2 and a data store operator 556-3. As illustrated in FIG. 5B, a task node of a flattened job flow graph can be expanded by separating a data store function from a data computation of a composite operator. The expansion of the task node can occur, for instance, when converting the flattened job flow graph to a data flow graph (e.g., as illustrated by the example of FIG. 3B). The expanded task node can include an additional operator 556-1 connected to a separated loader operator 556-2 connected to a separated data store operator 556-3. Although the present example illustrates one additional operator 556-1, examples in accordance with the present disclosure are not so limited and can include multiple additional operators.

When a converted data flow graph (e.g., 556-1, 556-2, 556-3) is reconverted back into a hybrid flow, the separated loader operator 556-2 and the separated data store operator 556-3 may be merged into a single operator 557-2. Thereby, the reconverted hybrid flow can include an additional operator 557-1 connected to an operator 557-2 with data computation functionality and data store functionality (e.g., a composite operator).

As illustrated by the examples of FIGS. 5A-5B, in addition to merging the contents from the data store operator (e.g., 554-1 of FIG. 5A and 556-3 of FIG. 5B) with the contents of the extractor operator (e.g., 554-2 of FIG. 5A) or loader operator (e.g., 556-2 of FIG. 5B), the reconverted hybrid flow can have edges updated. For instance, the output of the extractor operator (e.g., 554-2 of FIG. 5A) can become the output of the merged operator (555-1) and the input of the loader operator (e.g., 556-2 of FIG. 5B) can become the input of the merged operator (e.g., 557-2).

Figure 5C:
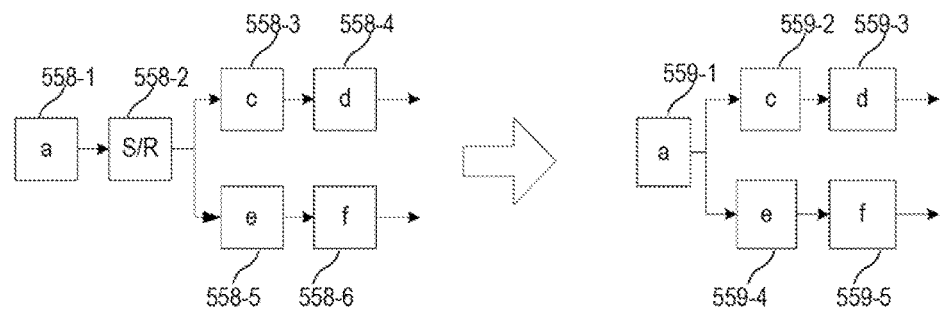

FIG. 5C illustrates validating a fork operator according to the present disclosure. In some instances, execution engines and/or analytic flow design tools can allow operators (e.g., fork operators) to have multiple inputs and allow defining different semantics considering the distribution of the data that comes from such a fork operator. For instance, data may be copied or distributed in a round robin fashion. In the converted data flow graph, such information may not be encoded inside operators for enabling optimization opportunities. Thereby, in the converted data flow graph, a fork operator node (e.g., a splitter and router) can be added to create multiple outputs for partitioning and/or replications. Such fork operators may be removed (e.g., by merging the functions of the fork operator into a producer operator of the fork operator) to reconvert the converted data flow graph into a hybrid flow. The output edges of the fork operators can be updated to start from the producer operator of the fork operator.

For instance, as illustrated in FIG. 5C, the converted data flow graph can include a number of operator nodes 558-1, 558-2, 558-3, 558-4, 558-5, 558-6 connected by edges. The operator node a 558-1 and operator node Splitter/Router (SIR) 558-2 can include an operator from the hybrid flow that was separated into a data computation operator (e.g., operator a 558-1) and a fork operator (e.g., operator SIR 558-2). The fork operator (e.g., 558-2) can be used for creating multiple outputs. To convert the converted data flow graph back into the hybrid flow, the fork operator (e.g., operator S/R 558-2) can be removed from the data flow graph. The output edges can be updated to start from the producer (e.g., operator a 558-1) of the fork operator in the converted data flow graph and the output schema of the fork operator is redirected to the producer operator (558-1). Thereby, removing the fork operator (e.g., operator S/R 558-2) can include merging the functionality of the fork operator 558-2 with the producer converted operator (e.g., operator a 558-1). The distribution type (e.g., copy or round robin) can be registered in the metadata of the producer operator.

For example, when a converted data flow graph (e.g., 558-1, 558-2, 558-3, 558-4, 558-5, 558-6) is reconverted back into a hybrid flow, the fork operator (e.g., operator S/R 558-2) is merged into the producer converted operator (e.g., operator a 558-1) to form operator a 559-1 of the reconverted hybrid flow. The reconverted hybrid flow can include a plurality of operators 559-1, 559-2, 559-3, 559-4, 559-5 connected by a plurality of edges.

Figure 5D:
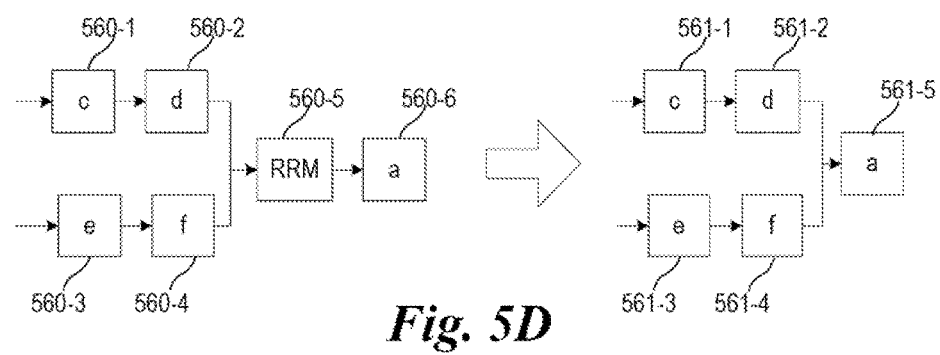

FIG. 5D illustrates validating a merger operator node according the present disclosure. Some execution engines and/or analytic flow design tools can allow multiple inputs to be merged for unary operators to be defined and can allow defining different semantics considering the distribution of the data that is input into such a merger operator. For instance, data can be merged from multiple inputs in a variety of ways (e.g., round robin merging, sort merging, etc.). In the converted data flow graph, such information may not be encoded inside operators for enabling optimization opportunities. Thereby, in the converted data flow graph, a merger operator node (e.g., round robin merger, sort merger, etc.) can be added to merge multiple inputs for a consumer operator. Such merger operators may be removed (e.g., by merging the functions of the merger operator into a consumer operator of the merger operator) to reconvert the converted data flow graph into a hybrid flow. The input edges of the merged operators (e.g., the merger operator and the consumer operator) can be updated to start from the consumer of the merger operator.

For instance, as illustrated in FIG. 5D, the converted data flow graph can include a number of converted operator nodes 560-1, 560-2, 560-3, 560-3, 560-4, 560-5, 560-6 connected by edges. The operator node round robin merger (RRM) 560-5 and operator node a 560-6 can include an operator from the hybrid flow that was separated into a merger operator (e.g., operator RRM 560-5) and a data computation operator (e.g., operator a 560-6). The merger operator (e.g., RRM 560-5) can be used for merging multiple inputs (e.g., can merge inputs from operator d 560-2 and operator f 560-4). To convert the converted data flow graph back into the hybrid flow, the merger operator (e.g., RRM 560-5) can be removed from the data flow graph. The input edges can be updated to start from the consumer operator (e.g., operator a 560-6) of the merger operator in the converted data flow graph and input schema of the merger operator is redirected to the consumer operator (560-6). Thereby, removing the merger operator (e.g., RRM 560-5) can include merging the functionality of the merger operator with the consumer operator (e.g., operator a 560-6). The merger type (e.g., round robin or sort) can be registered in the metadata of the consumer operator.

For instance, when a converted data flow graph (e.g., 560-1, 560-2, 560-3, 560-4, 560-5, 560-6,) is reconverted back into a hybrid flow, the merger operator (e.g., operator RRM 560-5) is merged into the consumer converted operator (e.g., operator a 560-6) to form operator a 561-5 of the reconverted hybrid flow. The reconverted hybrid flow can include a plurality of operators 561-1, 561-2, 561-3, 561-4, 561-5 connected by a plurality of edges.

Although the examples of FIGS. 5A-5D illustrate a particular number of each particular feature (e.g., operators, converted operators/nodes, edges, etc.) examples in accordance with the present embodiment are not so limited. The number of each particular feature can include a variety of numbers that may be more or less than illustrated in FIGS. 5A-5D, for instance.

In various examples of the present disclosure, in addition to the validation operations illustrated in the examples of 5A-5D, validation operations may be performed for operators that are predecessor(s) of n-ary operators and connector operators in the converted data flow graph. For instance, some execution engines may define the correspondence of an operator with its predecessor(s) inside the operator's metadata. This may occur when the semantics of an operator depends on the order of its predecessor(s). For instance, a StreamLookup operator has two inputs: one input is treated as a stream, while the other is stored in the form of a lookup table.

If a converted data flow graph is optimized, the order (e.g., placement) of operators in the converted data flow graph may change. The metadata of the operators, however, may need to remain correct. Thus, a validation operation can be performed to validate that the metadata of these operators remains correct. To validate an n-ary operator, inside such an n-ary operator in the converted flow language (e.g., xLM) is stored a special property, called "card_origin", that defines the order and origin of the input schemata (e.g., and, thus, of the producer operators). An example of an input schema of an operator (e.g., a property) that is populated by a "sort rows" operation can include:

```
<ndprop>
   <ptype>card_origin</ptype>
   <expr>
   <leftfun />
   <leftop>2</leftop>
   <oper>=</oper>
   <rightfun />
   <rightop>Sort rows</rightop>
   </expr>
</ndprop>
```

This property can be updated during an optimization process when the order of operators is modified and the modification affects the value of the property. When the flow is parsed, however, the validation can confirm that the property is set and valid by comparing its value to the actual inputs of the operator.

For instance, validating a predecessor operator of an n-ary operator can include determining if the property is found. If the property is found and it is valid (e.g., the operators described in the property are found in the flow), the property value is used. If the property value is found and is incorrect (e.g., because it is not updated from an optimized order) and/or if the property value is not found, the output schema of the producers of the node (e.g., operator) under examination can be searched for using a parameter attribute(s) of the n-ary operator (e.g., join key for a join) and the operator, in whose schemata the attribute is found, is used. If the attribute is found in the output schemata of one or more producers, then the order of the input edges in the converted data flow graph is used to determine the predecessor information of the n-ary operator.

Furthermore, connector operators added to the converted data flow graph (e.g., used to connect flow fragments belonging to different task flows inside a job), can be resolved using a validation operation when parsing the converted data flow and importing the converted data flow to a chosen execution engine. As previously discussed, two types of connector operators may be added: a pipeline connecter and a data store connector.

Validating either a pipeline connector operator or a data store connector operator can include removing the connector operator from the converted data flow. For instance, with a data store connector operator, the connector identifies a data store that is referenced inside the connector and is accessible to both the producer operator and consumer operator. To remove the data store connector operator, two data store operator nodes are generated using the properties and metadata stored in the data store connector operator. In addition, as discussed with regards to FIGS. 5A-5B, an extractor operator and/or loader operator that may accompany the data store connector operator are validated. Further, a pipeline connector operator can be removed by populating the corresponding operators (e.g., producer and consumer of the pipeline connector operator) using the metadata stored in the pipeline connector operator.

Figure 6:
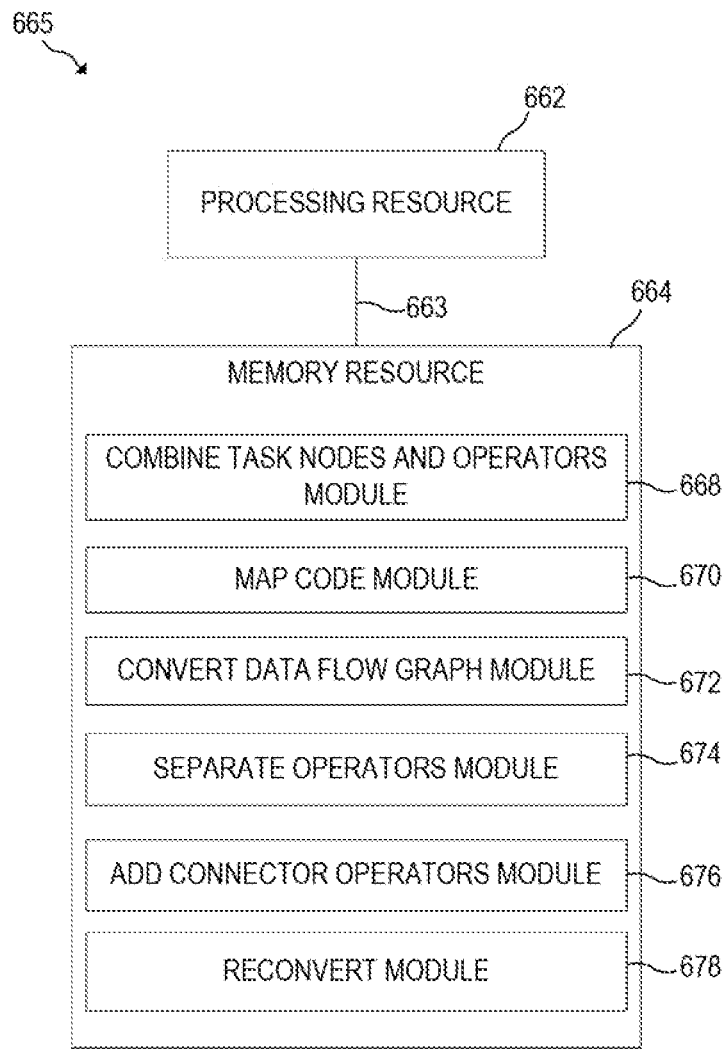
FIG. 6 illustrates an example of a system according to the present disclosure.

FIG. 6 illustrates an example of a system 665 according to the present disclosure. The system 665 can use software, hardware, firmware, and/or logic to perform a number of functions.

The system 665 can be any combination of hardware and program instructions configured to convert a hybrid flow. The hardware, for example can include a processing resource 662, and/or a memory resource 664 (e.g., computer-readable medium (CRM), machine readable medium (MRM), database, etc.) A processing resource 662, as used herein, can include any number of processors capable of executing instructions stored by a memory resource (e.g., 664). Processing resource 662 may be integrated in a single device or distributed across devices. The program instructions (e.g., computer-readable instructions (CRI)) can include instructions stored on the memory resource 664 and executable by the processing resource 662 to implement a desired function (e.g., convert a flattened job flow graph to a data flow graph using mapped code templates, etc.).

The memory resource 664 can be in communication with a processing resource 662. A memory resource 664, as used herein, can include any number of memory components capable of storing instructions that can be executed by processing resource 662. Such memory resource 664 can be a non-transitory CRM. Memory resource 664 may be integrated in a single device or distributed across devices. Further, memory resource 664 may be fully or partially integrated in the same device as processing resource 662 or it may be separate but accessible to that device and processing resource 662. Thus, it is noted that the system 665 may be implemented on a user and/or a client device, on a server device and/or a collection of server devices, and/or on a combination of the user device and the server device and/or devices.

The processing resource 662 can be in communication with a memory resource 664 storing a set of CRI executable by the processing resource 662, as described herein. The CRI can also be stored in remote memory managed by a server and represent an installation package that can be downloaded, installed, and executed. The system 665 can include memory resource 664, and the processing resource 662 can be coupled to the memory resource 664

Processing resource 662 can execute CRI that can be stored on an internal or external memory resource 664. The processing resource 662 can execute CRI to perform various functions, including the functions described with respect to FIGS. 1-5. For example, the processing resource 662 can execute CRI to convert a flattened job flow graph to a data flow graph using a plurality of mapped code templates.

The CRI can include a number of modules 668, 670, 672, 674, 676, 678. The number of modules 668, 670, 672, 674, 676, 678 can include CRI that when executed by the processing resource 662 can perform a number of functions. In a number of examples, the number of modules 668, 670, 672, 674, 676, 678 can include logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The number of modules 668, 670, 672, 674, 676, 678 can be sub-modules of other modules. For example, the convert data flow graph module 672, the separate operators module 674, and the add connector operators module 676 can be sub-modules and/or contained within the same computing device. In another example, the number of modules 668, 670, 672, 674, 676, 678 can comprise individual modules at separate and distinct locations (e.g., CRM, etc.).

A combine task nodes and operators module 668 can include CRI that when executed by the processing resource 662 can provide a number of combining functions. The combine task nodes and operators module 668 can combine each of a plurality of task nodes of the job flow graph with a plurality of operators (e.g., corresponding operators) of associated task flow graphs of the hybrid flow. Operators of an associated task flow graph can include operators internal to a task flow represented by a task node.

A map code module 670 can include CRI that when executed by the processing resource 662 can perform a number of mapping functions. The map code module 672 can map the flattened job flow graph to a plurality of code templates. The mapping can include a 1:1 mapping of task nodes, control point nodes, and operators to the plurality of code templates, for instance.

A convert data flow graph module 672 can include CRI that when executed by the processing resource 662 can perform a number of conversion functions. The convert flow graph module 676 can convert the flattened job flow graph to a data flow graph using the plurality of mapped code templates.

A separate operators module 674 can include CRI that when executed by the processing resource 662 can perform a number of separation functions. The separate operators module 674 can separate an identified operator that includes a data computation function and a data store function into a data computation operator and a data store operator. In various examples, multiple operators can be separated.

An add connector operators module 676 can include CRI that when executed by the processing resource 662 can perform a number of adding connector operator functions. The add connector operators module 674 can add a connector operator between operators associated with a connection between two task nodes among the plurality of task nodes in the converted data flow graph. In various examples, multiple connector operators can be added.

A reconvert module 678 can include CRI that when executed by the processing resource 662 can perform a number of reconversion functions. The reconvert module 678 can reconvert the converted data flow graph to the job flow graph and the plurality of associated task flow graphs of the hybrid flow, in response to a tool processing the converted data flow graph (e.g., an optimizer optimizing the single data flow graph). The reconversion can include converting a plurality of converted data flow graph nodes to operators using the mapped code templates.

In various examples, the reconvert module can include instructions to merge operators to reconvert the converted data flow graph. For instance, the instructions can include merge a data computation operator and a data stored operator back into an operator (e.g., the identified operator). The instructions can further include merge a fork operator into a producer operator among the plurality of operations. And, the instructions can include merge a merger operator into a consumer operator among the plurality of operators.

A memory resource 664, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The memory resource 664 can be integral, or communicatively coupled, to a computing device, in a wired and/or a wireless manner. For example, the memory resource 664 can be an internal memory, a portable memory, a portable disk, or a memory associated with another computing resource (e.g., enabling CRIs to be transferred and/or executed across a network such as the Internet).

The memory resource 664 can be in communication with the processing resource 662 via a communication path 663. The communication path 663 can be local or remote to a machine (e.g., a computing device) associated with the processing resource 662. Examples of a local communication path 663 can include an electronic bus internal to a machine (e.g., a computing device) where the memory resource 664 is one of volatile, non-volatile, fixed, and/or removable storage medium in communication with the processing resource 662 via the electronic bus.

The communication path 663 can be such that the memory resource 664 is remote from the processing resource (e.g., 662), such as in a network connection between the memory resource 664 and the processing resource (e.g., 662). That is, the communication path 663 can be a network connection. Examples of such a network connection can include a local area network (LAN), wide area network (WAN), personal area network (PAN), and the Internet, among others. In such examples, the memory resource 664 can be associated with a first computing device and the processing resource 662 can be associated with a second computing device (e.g., a Java® server).

For example, a processing resource 662 can be in communication with a memory resource 664, wherein the memory resource 664 includes a set of instructions and wherein the processing resource 662 is designed to carry out the set of instructions.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for converting a hybrid flow comprising:
   identifying a plurality of task nodes of a job flow included in the hybrid flow;
   identifying a plurality of operators of a task flow included in the hybrid flow, wherein an operator among the plurality of operators is a composite operator;
   generating a single data flow by:
     separating the composite operator into a plurality of distinct operators; and
     combining each of the plurality of task nodes with the plurality of operators and the separated distinct operators;
   mapping the plurality of task nodes and the plurality of operators to a code template of a plurality of code templates, wherein each of the plurality of code templates is a different extract-transfer-load logical model template;
   converting the single data flow to a data flow graph using the mapped code template;
   inputting the data flow graph to an optimizer to optimize execution of the data flow graph, the optimizer globally optimizing the data flow graph in a pushdown manner to improve operator cohesion of the data flow graph; and
   executing the optimized data flow graph on a plurality of execution engines.

2. The method of claim 1, wherein converting the single data flow to the data flow graph includes converting a plurality of graphs of the hybrid flow to a single data flow graph.

3. The method of claim 1, wherein converting the single data flow to the data flow graph includes capturing structural information and flow metadata from the hybrid flow.

4. The method of claim 1, wherein converting the single data flow to the data flow graph includes adding a connector operator between at least two operators among the plurality of operators or the separated distinct operators.

5. A non-transitory computer-readable medium storing instructions executable by a processing resource to:
   generate a single data flow by combining a plurality of task nodes from a job flow graph included in a hybrid flow, with a plurality of operators from a plurality of task flow graphs included in the hybrid flow, wherein an operator among the plurality of operators is a composite operator;
   separate the composite operator into a data source operator and a data computation operator;
   convert the single data flow to a data flow graph using a plurality of code templates, wherein each of the plurality of code templates is a different extract-transfer-load logical model template;
   optimize execution of the data flow graph by inputting the data flow graph to an optimizer, the optimizer globally optimizing the data flow graph in a pushdown manner to improve operator cohesion of the data flow graph; and
   execute the optimized data flow graph on a plurality of execution engines.

6. The non-transitory computer-readable medium of claim 5, wherein the instructions to separate the composite operator include instructions executable to separate reading threads and extraction code from the composite operator.

7. The non-transitory computer-readable medium of claim 5, wherein the instructions to separate the composite operator include instructions executable to separate loading code and writing threads from the composite operator.

8. The non-transitory computer-readable medium of claim 5, including instructions executable to adjust at least one of an input schema and an output schema of the data computation operator based on a predecessor operator.

9. The non-transitory computer-readable medium of claim 5, including instructions executable to convert the optimized data flow graph to a job flow format and a task flow format.

10. A system for converting a hybrid flow, the system comprising:
a processing resource;
a memory resource communicatively coupled to the processing resource containing instructions executable by the processing resource to:
identify a plurality of task nodes of a job flow included in a hybrid flow;
identify a plurality of operators of a task flow included in the hybrid flow, wherein an operator among the plurality of operators is a composite operator;
flatten the job flow, by:
combining the plurality of task nodes with the plurality of operators;
map the flattened job flow to a plurality of code templates, wherein each of the plurality of code templates is a different extract-transfer-load logical model template;
convert the flattened job flow to a data flow graph using the plurality of mapped code templates;
input the data flow graph to an optimizer to optimize execution of the data flow graph, the optimizer globally optimizing the data flow graph in a push-down manner to improve operator cohesion of the data flow graph; and
convert the optimized data flow graph to a job flow format and a task flow format for execution on a plurality of execution engines.

11. The system of claim 10, including instructions executable to add a pipeline connector operator between two operators among the plurality of operators.

12. The system of claim 10, including instructions executable to add a data store connector operator that is accessible to a producer operator and a consumer operator among the plurality of operators.

13. The system of claim 10, wherein the instructions executable by the processing resource to convert the optimized data flow graph to the job flow format and a task flow format include instructions executable to:
merge the data computation operator and the data store operator back into the composite operator.

14. The system of claim 10, wherein the instructions executable by the processing resource to convert the optimized data flow graph to the job flow format and the task flow format include instructions executable to:
merge a separated fork operator into a producer operator among the plurality of operators.

15. The system of claim 10, wherein the instructions executable by the processing resource to convert the optimized data flow graph to the job flow format and the task flow format include instructions executable to:
merge a separated merger operator into a consumer operator among the plurality of operators.

16. The system of claim 10, wherein the instructions executable by the processing resource to convert the optimized data flow graph to the job flow format and the task flow format include instructions executable to:
remove the added connector operator from the converted data flow graph.

17. The system of claim 10, wherein the instructions executable by the processing resource to convert the optimized data flow graph to the job flow format and the task flow format include instructions executable to:
validate a predecessor operator of an n-ary operator.

18. The system of claim 10, wherein the composite operator includes a data computation function and a data store function, further including instructions executable by the processing resource to:
separate the data computation function and the data store function into a data computation operator and a data store operator in the converted data flow graph; and
add a connector operator between operators associated with a connection between two tasks nodes among the plurality of task nodes in the converted data flow graph.

19. The method of claim 1, wherein the optimizer pushes down optimization to execution engines corresponding to the operators, to globally optimize the data flow graph, leveraging optimization by the execution engines.

20. The method of claim 1, wherein the operator cohesion for a given operator is defined as a sum of a cardinality of an input schemata of the given operator and an output schemata of the given operator, divided by a product of a number of functions in the given operator and a sum of a number of input schemata and a number of the output schemata.

* * * * *